United States Patent [19]
Kobayashi

[11] Patent Number: 5,107,685
[45] Date of Patent: Apr. 28, 1992

[54] AIR CONDITIONING SYSTEM HAVING A CONTROL UNIT FOR FINE ADJUSTMENT OF INVERTER INPUT CURRENT

[75] Inventor: Takehiro Kobayashi, Fuji, Japan

[73] Assignee: Kabushiki Kaisha Toshiba, Kawasaki, Japan

[21] Appl. No.: 621,455

[22] Filed: Dec. 4, 1990

[30] Foreign Application Priority Data

Dec. 5, 1989 [JP] Japan .................. 1-316103

[51] Int. Cl.$^5$ .............................................. F25B 1/00
[52] U.S. Cl. ........................................ 62/115; 62/230; 318/807; 361/87
[58] Field of Search ............. 62/115, 228.4, 230; 361/24, 22, 87, 93; 417/45; 318/807

[56] References Cited

U.S. PATENT DOCUMENTS

5,027,049 6/1991 Pratt et al. ..................... 318/807

FOREIGN PATENT DOCUMENTS

58-18046 2/1983 Japan .
0190233 8/1986 Japan .................. 62/230
0235628 10/1986 Japan .................. 62/230

*Primary Examiner*—William E. Wayner
*Attorney, Agent, or Firm*—Foley & Lardner

[57] ABSTRACT

An air conditioning system comprises an inverter that inverts commercial power into a variable-frequency AC and supplies it to a compressor; a DC power circuit for converting the commercial power into DC current; a unit for detecting an analog value of current supplied from the commercial power; and a control unit to control inverted digital data by compensating the digital current data discrepancy due to scattering of the DC control voltage, when there is A/D conversion after an actual power supplied to the inverter has been detected via the detector. The control unit comprises an A/D converter that uses the output of the DC current circuit as the reference for converting the current detection unit output into digital DC data, a controller that compares the allowable current data stored beforehand with the current data converted by the A/D converter and limits the output frequency of current inverted by the inverter so that commercial power current does not exceed the allowable value, a memory to store a compensated current value so that discrepancies in the current data can be compensated for on the basis of DC output discrepancies, and a compensator to compensate the current allowable value data.

10 Claims, 7 Drawing Sheets

AIR CONDITIONING SYSTEM HAVING A CONTROL UNIT FOR FINE ADJUSTMENT OF INVERTER INPUT CURRENT

BACKGROUND OF THE INVENTION

The present invention relates to an air conditioning system that controls an operating current to within the maximum allowable range and that has performance control operation for the compressor in accordance with the air conditioning load.

Figure 1:
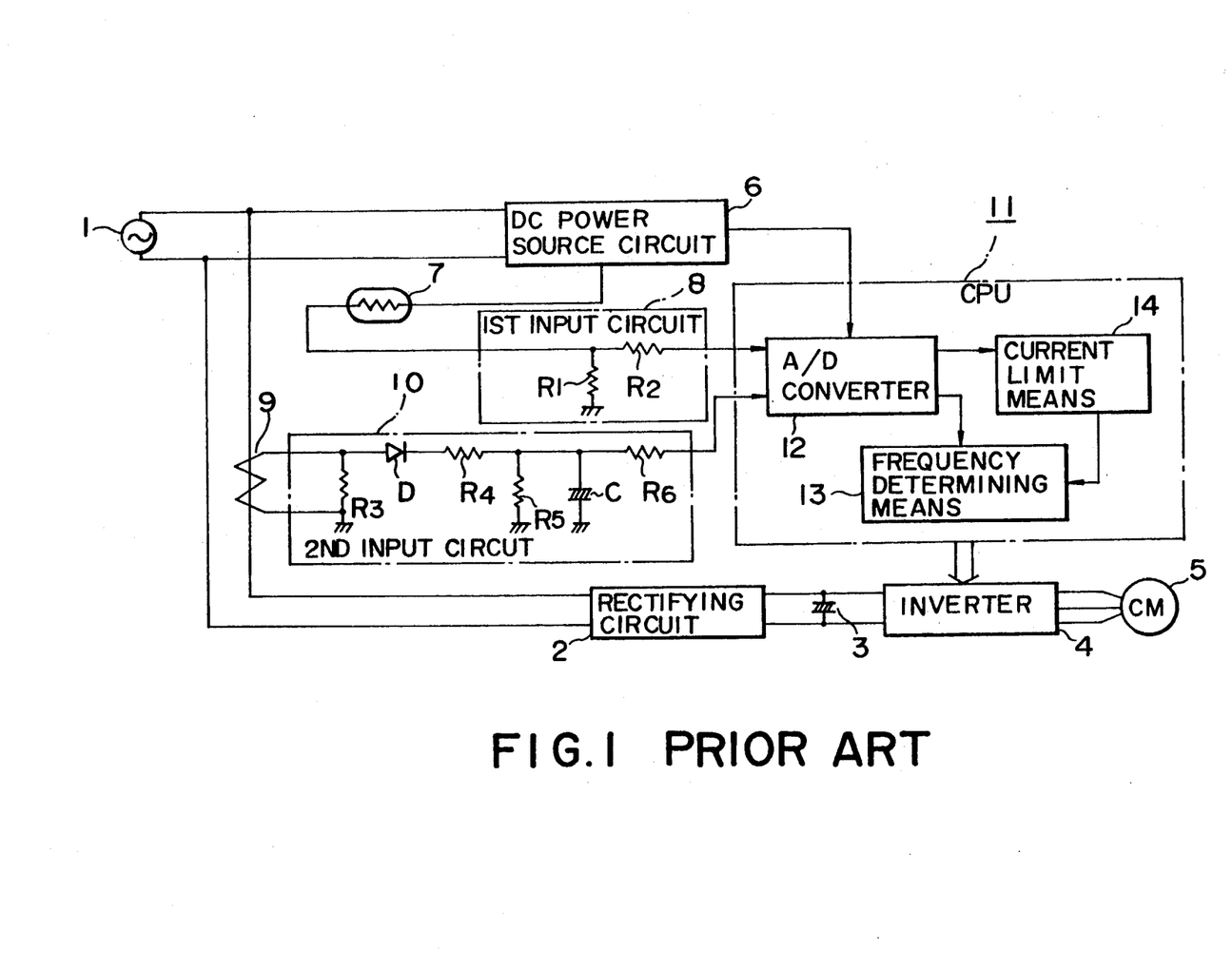
FIG. 1 is a block diagram showing the configuration of a conventional air conditioning system.

FIG. 1 is an outline diagram showing the configuration of a control portion of a conventional air conditioning system of this type. In the figure, to a commercial AC power source 1 is connected an inverter 4 via a rectifier circuit 2 and a smoothing capacitor 3, and the variable frequency AC output of the inverter 4 is supplied to a compressor motor 5. In addition, to the commercial power source is also connected a DC power circuit 6 that becomes the power source for equipment that includes a central processing unit (hereinafter termed CPU) 11 comprising a microcomputer, for example. Both outputs of a temperature sensor 7 comprising thermistors and a current transformer 9 is supplied to the CPU II. The transformer 9 detects the size of an AC current which is supplied from the commercial power source 1 to the rectifier circuit 2.

The CPU 11 comprises an analog/digital (A/D) converter 12 for functionally reading both the output of the sensor 7 and transformer 9 as digital data, a frequency determining means 13 for determining an output frequency of the inverter 4 in accordance with the temperature detected by the sensor 7 and indicating the output frequency to the inverter 4, and a current limit means 14 for applying a limit to the output frequency indicated to the inverter 4 by the frequency determining means 13 in the manner that the value of the commercial current supplied to the inverter 4 from the commercial power does not exceed an allowable value.

The current limit means 14 restricts a current capacity of the air conditioning system to less than a predetermined value. Accordingly, the output frequency of the inverter 4 is usually determined in accordance with the temperature detected by the sensor 7. However, if the current supplied to the compressor motor from the AC power source becomes large and exceeds the predetermined value, the output frequency of the inverter 4 is lowered and the current to the air conditioning system is also lowered.

Namely, according to an increase in the air conditioning load, the value of the DC current supplied from the power source 1 is increased. However, many general households do not have the construction which is capable of supplying the sufficient DC current through the power sockets and electrical wirings so that the current capacity of the system of an air conditioning apparatus is limited to about 20 A, for example. For this reason, the system of the inverter that consumes a large current is provided with the current transformer 9 and the current detection signals are applied to the CPU 11 via a second input circuit 10. These analog current signals applied to the CPU II are converted into digital current data by the A/D converter 12. The current limit means 14 compares the allowable current data stored in the ROM (not indicated in the figure) with the current data converted by the A/D converter 12 and places a limit on the output frequency of the frequency determining means 13 so that the current supplied from the commercial power source 1 does not exceed the allowable value. Furthermore, the limit of the frequency is attained by performing control to lower the frequency each time the operating time exceeds a predetermined value for a high zone of a plural number of zones into which the current control range has been divided but the description of this frequency control is omitted as it has already been proposed.

A following comparison type of A/D converter is used for the A/D converter 12 that comprises the conventional air conditioning system as has been described above, and 0–5 V analog input signals corresponding to a current of 0–25 A detected of 5.0 V of the DC current circuit 6 as the reference voltage, is converted into 8-bit digital data and output. Accordingly, if the current supplied to the current transformer 9 changes by 0.1 A, then the output digital data changes by only "1".

In this case, if a high-accuracy apparatus is used as DC current circuit 6, then there is a precise correspondence between the output data of the A/D converter 12 and the actual current value detected by the current transformer 9. However, in this type of air conditioning system, there occur discrepancies in the output voltage due to a scattering of the characteristics of the circuit parts for which temporal changes have been sufficiently suppressed, and the relationship between the actual current data and the data output from the A/D converter 12 changes.

Figure 2:
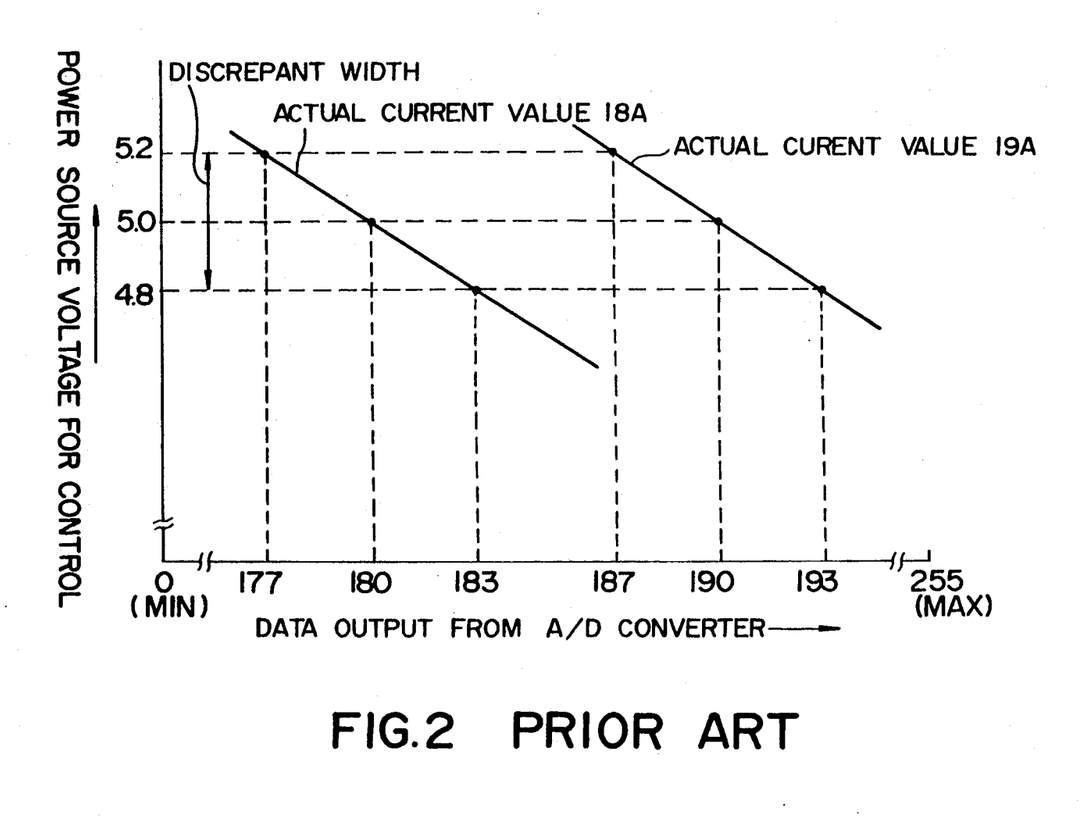
FIG. 2 is a diagram showing the relationship between a control power voltage and A/D conversion data, for the purpose of describing the operation of the system.

FIG. 2 is a diagram describing this relationship. Here, a current of 18A is flowing in the current transformer 9. In this status, if the control power voltage which is the output of the DC current circuit 6, is 0.5 V, then the data output from the A/D converter 12 becomes "180". Here, suppressing the width of scattering of the control power voltage to 0.2 V and applying a control power voltage of 5.2 V to the A/D converter 12 causes the data output from the A/D converter 12 to become "177" and if a control power voltage of 4.8 V is applied to the A/D converter 12, the data output from the A/D converter 12 becomes "183". In other words, the scattering of the output voltage of the D/C current circuit 6 actually changes the 18A current signals to 17.7 A or to 18.3 A.

In the same manner, when an actual current of 19 A is flowing in the current transformer 9, it is changed to 18.7 A or to 19.3 A.

In this manner, when the control power current is 4.8 V, the current data is larger than the actual value by 0.3 A and predicting this so that the current flowing to the inverter 4 is limited to 19.5 A, means that the allowable current data in the ROM referred to by the inverter 4 must be set to "192" corresponding to 19.2 A. Accordingly, in the status where the data in the ROM is set to "192", if the control voltage is 5.2 V, the actual current is limited to 18.9 A and it is no longer possible to have the maximum air conditioning performance.

The above description has been done for the changing of the value for the current detected by the current transformer 9 but the voltage that is impressed to the temperature sensor 7 is supplied from the DC current circuit 6 and this voltage is proportional to the control power voltage so that the A/D converter 12 does not change the temperature data.

When the value for the current supplied from the commercial power source 1 to a conventional air conditioning system is limited to less than an allowable value, then there is the problem that there must be operation for which the performance is suppressed.

SUMMARY OF THE INVENTION

An object of the present invention is to provide an air conditioning system in which the problem described above is eliminated and that can exhibit a sufficient performance within a range of current values supplied from commercial power.

In order to achieve the above object, an air conditioning system according to the present invention comprises a power conversion apparatus for converting commercial power into an alternating current having a variable frequency, a DC power circuit for converting the commercial power into DC current to output, current detection means for detecting a value of current supplied from the commercial power, an A/D converter for converting an output of the current detection means into digital current data by using the DC current output from the DC power circuit as a reference, current limit means for limiting an output frequency of the power conversion apparatus in the manner that the current supplied from the commercial power source does not exceed an allowable value by comparing the allowable current data stored beforehand with the current data converted by the A/D converter, compensated current value memory means for storing a compensated current value obtained by compensating for the discrepancy portion of the current data on the basis of the output discrepancy of the DC current power circuit, and current data compensating means for compensating the allowable current data in accordance with this compensated current value.

In addition, the system according to the present invention may also comprise a compensated current value determining means for determining the time-average value of the current data of the A/D converter in the case where a current corresponding to an allowable value for the current supplied from the commercial power flows in the current detection means, for calculating the discrepancy between the time-average value and an initial setting value for the allowable current data, and for storing the discrepancy in the compensated current value memory means as the current compensation value.

In the present invention, the discrepancy portion of the current data obtained on the basis of output discrepancies in the DC current circuit are stored as a compensated current value for compensation, and the allowable current data is compensated for in accordance with the compensated current value and so if the compensated current value memory means is an electrically erasable and programmable ROM (hereinafter EEPROM), then there need only be the simple operation of wiring the value to it at the stage of adjustment of the manufacturing line.

In addition, if the compensated current value determining means is provided, then it is possible to have automatic write to the EEPROM with the simple operation of allowing the allowable current to flow to the current detection means.

As has been described above, according to the present invention, there are provided the compensated current value memory means that stores the compensated current value on the basis of the output discrepancy of a DC current circuit, and current data compensating means that compensates allowable current data in accordance with the compensated current value, and so it is possible to be exhibited within the range of current values supplied from commercial power.

In addition, by providing the compensated current value determining means for determining the time-average value of current data of the A/D converter in the case where a current corresponding to an allowable value for the current detection means, for calculating the discrepancy between the time-average value and an initial setting value for the allowable current data, and for storing the discrepancy in the compensated current value memory means as the compensated current value, it is possible to facilitate the setting operation for the compensated current value.

DETAILED DESCRIPTION OF THE PREFERRED EMBODIMENTS

Figure 3:
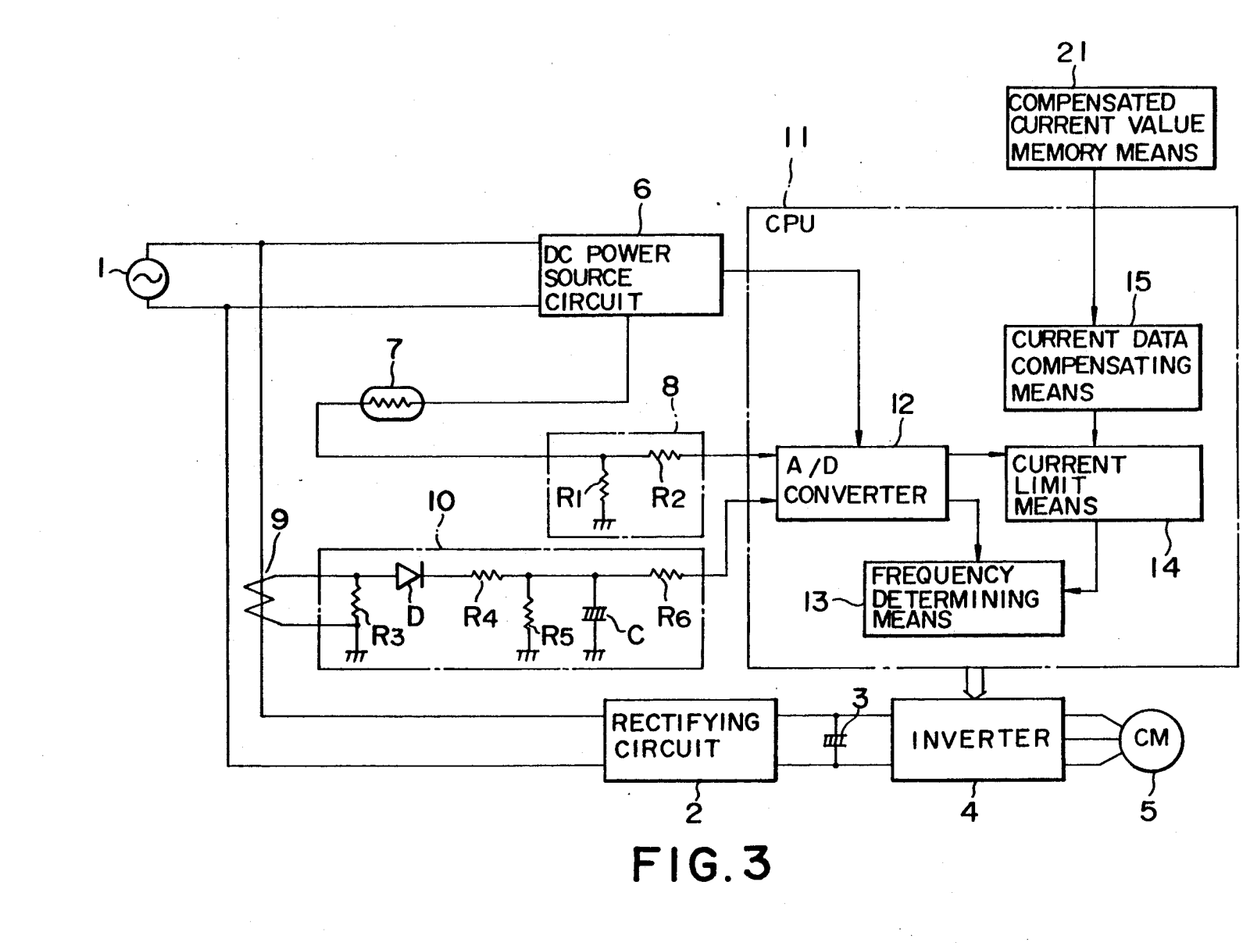
FIG. 3 is a block diagram showing the configuration of an air conditioning system according to a first embodiment of the present invention.

FIG. 3 is a block diagram showing the configuration of an air conditioning system according to a first embodiment of the present invention, and in the figure, portions that corresponding to similar portions of FIG. 1 are indicated with the same numerals.

A commercial power source I is connected to a rectifier circuit 2 that rectifies the AC current and outputs a pulse current. To the output side of the rectifier circuit 2 are connected a smoothing capacitor 3 for smoothing the pilse current, and an inverter 5 that converts the smoothed DC current into AC current, and supplies it to a compressor motor in accordance with the ON-OFF signals for the frequency corresponding to the air conditioning load. The commecial power source 1 is also connected to a DC current circuit 6 that rectifies AC current and supplies a stabilized current as control power to various types of equipment that include, a central processing unit (hereinafter termed a CPU) II and comprising, for example, a microcomputer, and a temperature sensor 7 for detecting the room temperature is connected to the CPU 11 via a first input circuit 8, and a current transformer 9 for detecting a current flowing from the commercial power source 1 to the inverter 4 is connected to the CPU II via a second input circuit 10.

The temperature sensor 7 comprises a thermistor, and the first input circuit 8 comprises a resistor $R_1$ connected between the DC output terminals of the DC current circuit 6 and which is also connected in series to the temperature sensor 7, and a resistor $R_2$ that takes the voltage at the point of mutual connection of the temperature sensor 7 and the resistor $R_1$, to the CPU 11. The second input circuit 10 comprises a resistor $R_3$ connected in parallel to the current transformer 9, resistors $R_4$ and $R_5$ that are connected in series via the diode D, so as to rectify and split the voltage generated at both ends of the resistor $R_3$, a capacitor C that stores the split voltage, and a resistor $R_6$ that takes the voltage of the capacitor C into CPU 11.

The CPU 11 is provided with an analog/digital converter (hereinafter, termed an A/D converter) 12 that converts the temperature signals takken in via the first input circuit 8, and the analog current signals taken in via the second input circuit 10, into digital temperature data, respectively, a frequency determining means 13 that determines the output frequency of the inverter 4 on the basis of the temperature data converted by the A/D converter 12, and a current limit means 14 that compares the allowable current data stored in the ROM (not indicated in the figure) with the current data converted by the A/D converter 12 and places a limit on the output frequency of the frequency determining means 13 so that the current supplied from the commercial power source 1 does not exceed the allowable value. In the first embodiment, there is also provided a current data compensating means 15 in the CPU 11 which comprises a single-chip microcomputer, and a compensated current value memory means 21 which is added to store the compensated current value that is to be referred to by the current data compensating means 15.

Of these two, when a current of the allowable limit is flowing in the current transformer 9, the memory means 21 compares the actual current data output from the A/D converter 12 with the allowable current data stored in the ROM (not indicated in the figure) for referral by the current limit means 14, and writes the discrepancy between them so that this write operation is performed at the stage of adjustment of the manufacturing line. In addition, the current data compensating means 15 performs compensation of the allowable current data stored in the ROM, by the value stored in the compensated value memory means 21 and adds it to the current limit means 14 at the new allowable current data.

Figure 4:
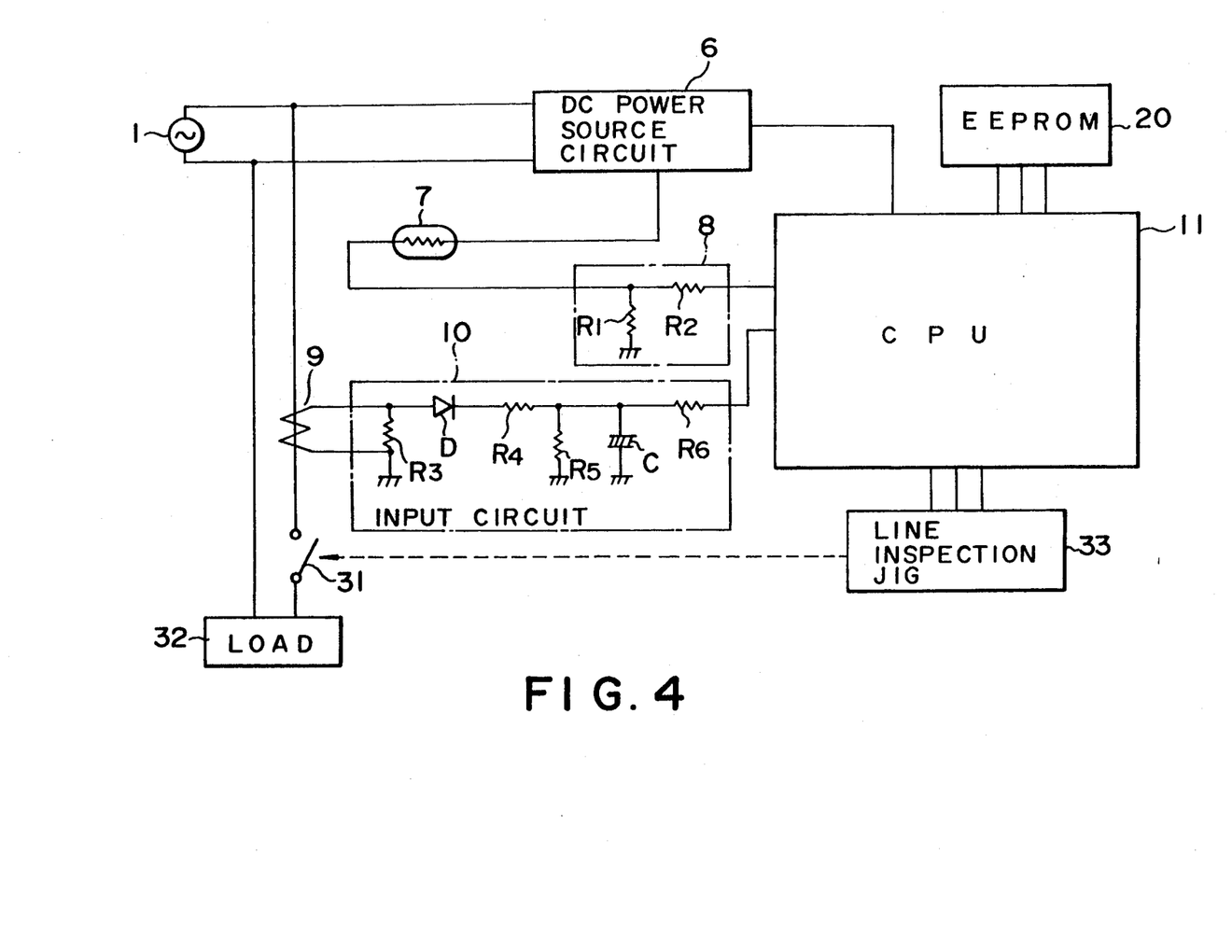
FIG. 4 is a block diagram of a specific example of the compensated value setting operation for the first embodiment of the present invention.

It is possible to use an EEPROM as the memory means 21 and a shown in FIG. 4, at the manufacturing line stage of adjustment, the EEPROM 20 can be connected to the CPU 11 and the rectifier circuit 2, the inverter 4 and the compressor motor 5, so that it is possible a line inspection jig 33 can be connected the CPU 11 by simply performing opening and closing control of the switch 31, and the EEPROM 20 written.

In this case, the switch 31 is closed by the line inspection jig 33 and a required current allowed to flow to a load 32 so that the DC current circuit 6 and the CPU 11 are operated normally, so that the output data of the A/D converter 12 at this time is read by the line inspection jig 33, the output of the A/D converter 12 compared with the value of the DC current that is actually flowing to the load 32, and that discrepancy written to the EEPROM 20.

If the current compensated value is stored to the EEPROM 20 in this manner, then the current limit means 14 automatically compensates the allowable current data when there is normal operation.

The following is more specific description of this portion.

First, the A/D converter 12 is of the successive comparison type that takes the output of the DC power circuit 6 as the reference voltage, and converts the value detected in accordance with the maximum value of "255" for the digital output of the reference voltage into the 8-bit digital data of "000" to "255". More specifically, the A/D converter 12 splits the reference voltage which is the output of the DC power circuit 6, and compares the size of the output of the current transformer 9 with the split value to determine the digital data. Here, when there is a scattering of ±4% of 5 V ±0.2 V in the output of the DC power circuit 6, the digital data output of the A/D converter 123 has a maximum of ±4% scattering.

In such a circuit, when a current of 19A flows to the detected line of the current transformer 9, the digital data output of the A/D converter 23 that accurately indicates 19A, is "190" but actually, the scattering of the reference voltage which is the output of the DC power circuit 6 is a value within the range of "193" to "187".

Accordingly, in the first embodiment, when there is a current within the allowable limit flowing in the detected line of the current transformer 9, the digital data output of the A/D converter 12 when there is a current within the allowable limit flowing in the detected line is calculated as a compensated current value that can be regarded as digital data corresponding to the current of the allowable limit so that the output frequency of the converter 4 can be reduced.

The compensated value when a current of 19A for example, which is within the allowable limit, is flowing in the load 32 when the switch 31 is closed, is determined by a line inspection jig 33 as the difference between the digital data output "193" of the A/D converter 12, and the accurate and allowable current data "190" that corresponds to the current value 19A which is the allowable limit for current flowing in the actual load 32. This is to say that when there is the allowable limit current of 19A flowing, and the digital data output of the A/D converter 12 is "193", the compensated current value is calculated as "003" by the line inspection jig 33 and the current compensated value is calculated as "−003" when the digital data output of the A/D converter 12 is "187".

The compensated value determined by this line inspection jig 33 is input and stored in the EEPROM 20 of the air conditioning system from the line inspection jig 33.

When the air conditioning system is in operation, this compensated current value is added to the allowable current data and operation continues as new allowable current data.

Moreover, it is possible to not add the compensated value to the allowable data and to subtract the compensated value from the digital data output of the A/D converter 12 and to compare the data after subtraction with the allowable current data. In either case, the operation is the same.

Figure 5:
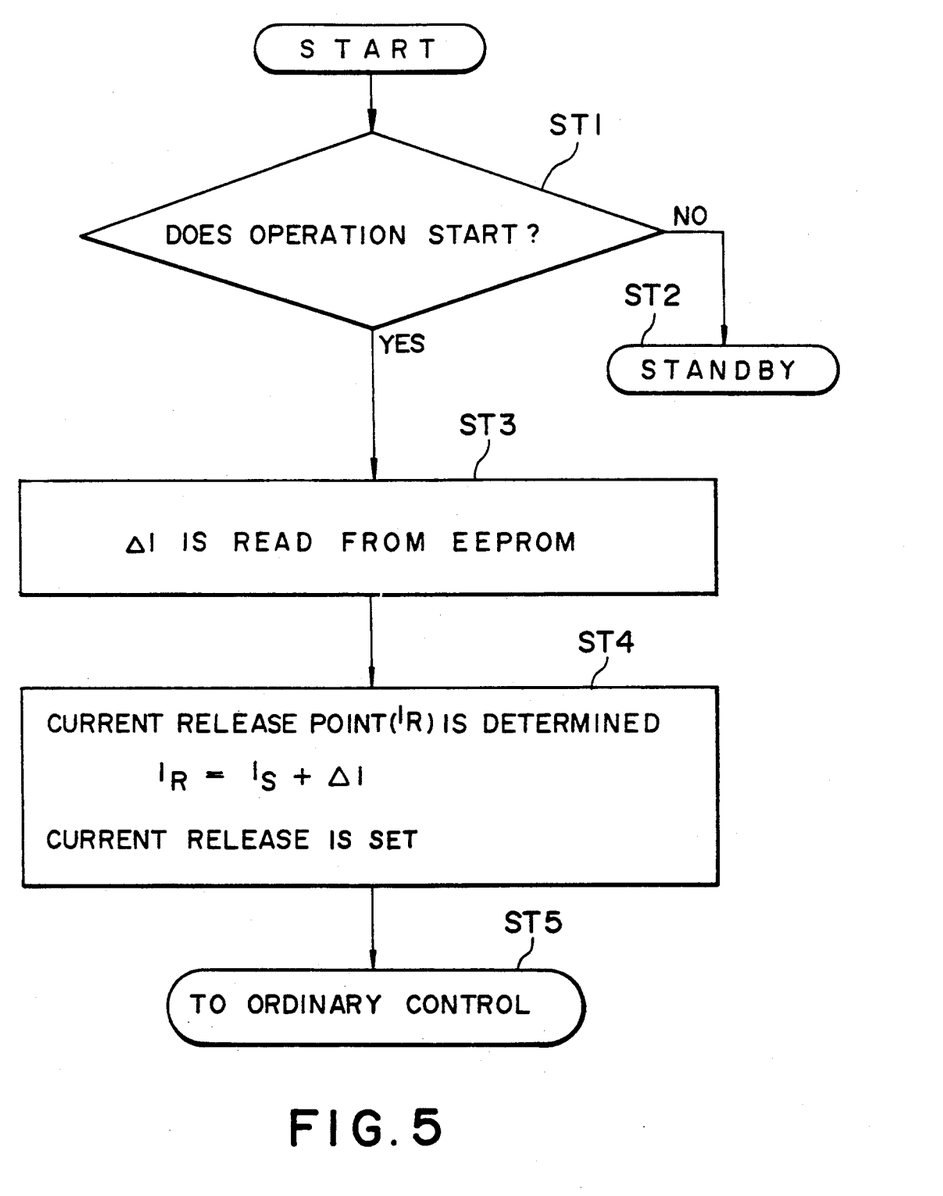
FIG. 5 is a flow chart describing the operation for the first embodiment of the present invention.

FIG. 5 is a flow chart that shows the processing procedures of the CPU !1 which corresponds to the current data compensating means 15 that performs compensation of the current data when the air conditioning system is in operation, and which first checks for whether or not operation has started (step ST1), and if it is judged that operation has started, reads the compensated value ΔI from the EEPROM 20 (step ST2), and then after the maximum allowable current data, that is, the release point $I_R$ has been set (step ST3), shifts to normal control (step ST4). The release point $I_R$ is when the compensated current value $\Delta I$ has been added to the standard allowable current data $I_S$ stored in the ROM (not shown in the figure).

According to the first embodiment, by the simple operation of writing the compensated value to the memory means 21 at the manufacturing line stage of adjustment, it is possible to eliminate excessive current control accompanying scattering of the output of the DC current circuit 6, and therefore suppress the limit range of the maximum current to the value of ±0.1 A for example, corresponding to output data of "1" for the A/D converter 12.

In the first embodiment described above, the compensated current value is determined by the line inspection jig 33 and furthermore, this compensated current value is written to the current data compensating means 15 using the line inspection jig 33 but it is possible to incorporate these functions into the CPU 11.

Figure 6:
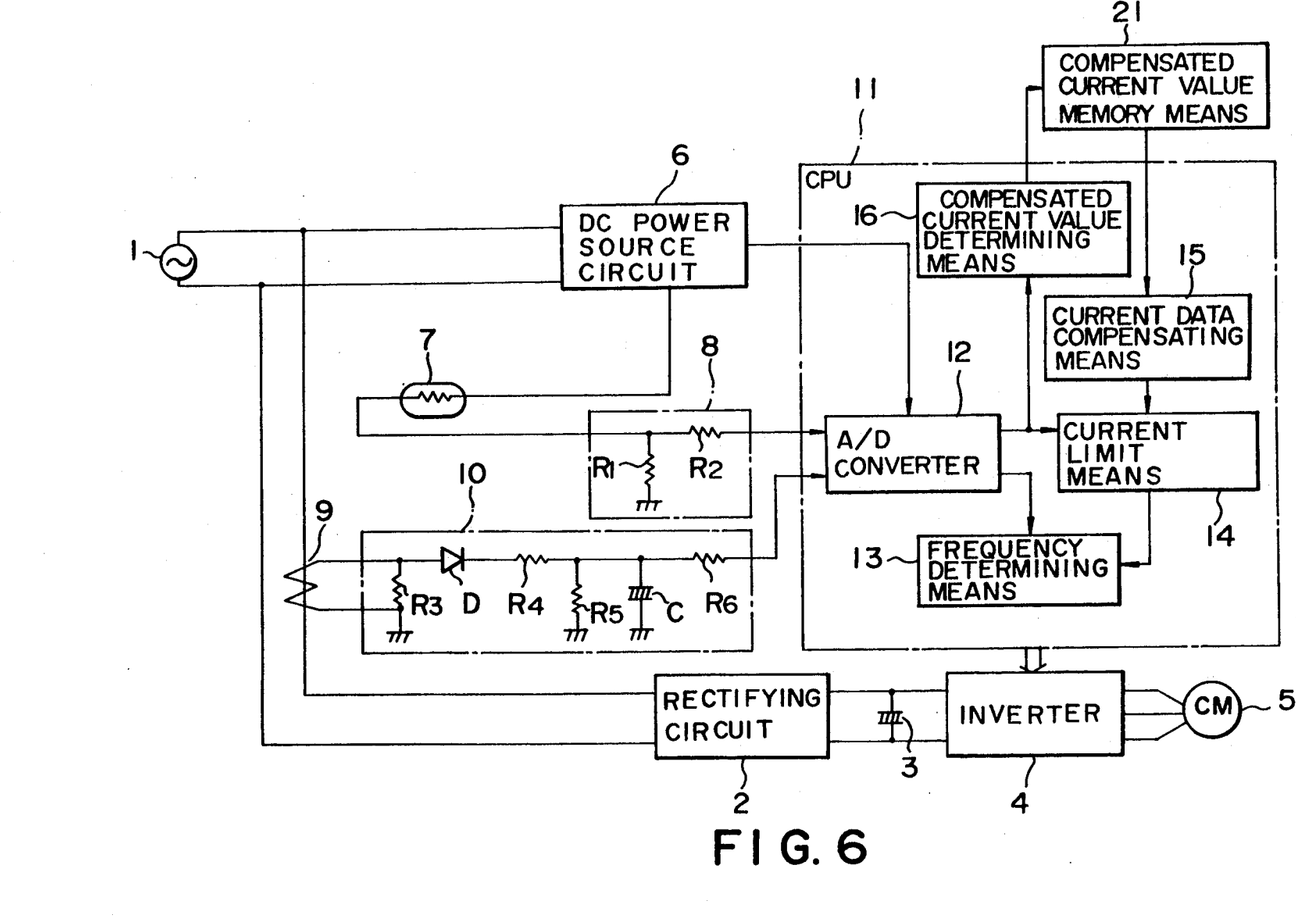
FIG. 6 is a block diagram showing the configuration of another embodiment according to the present invention.

FIG. 6 shows the second embodiment according to the present invention. In the figure, portions that correspond to similar portions of FIG. 3 are indicated with the same numerals. Here, the air conditioning system is provided with a compensation mode as a mode to automatically store the compensated current value without the use of a line inspection jig in the stage of the manufacturing line. This compensation mode is manually selected in the manufacturing line. The calculation and storage of this compensated current value in the compensation mode is achieved by allowing a current of the allowable limit to flow in the detected line of the current transformer 9.

In an air conditionig system having this compensation mode, digital data corresponding to a current of the allowable limit and flowing in the detected line in the compensation mode is stored in the CPU 11, and when a current of the allowable limit is actually flowing in the detected line, the difference between the digital data output of the A/D converter 12 and the digital data corresponding to the current of the allowable limit which is stored beforehand is determined inside the CPU 11 as the compensated current value.

Figure 7:
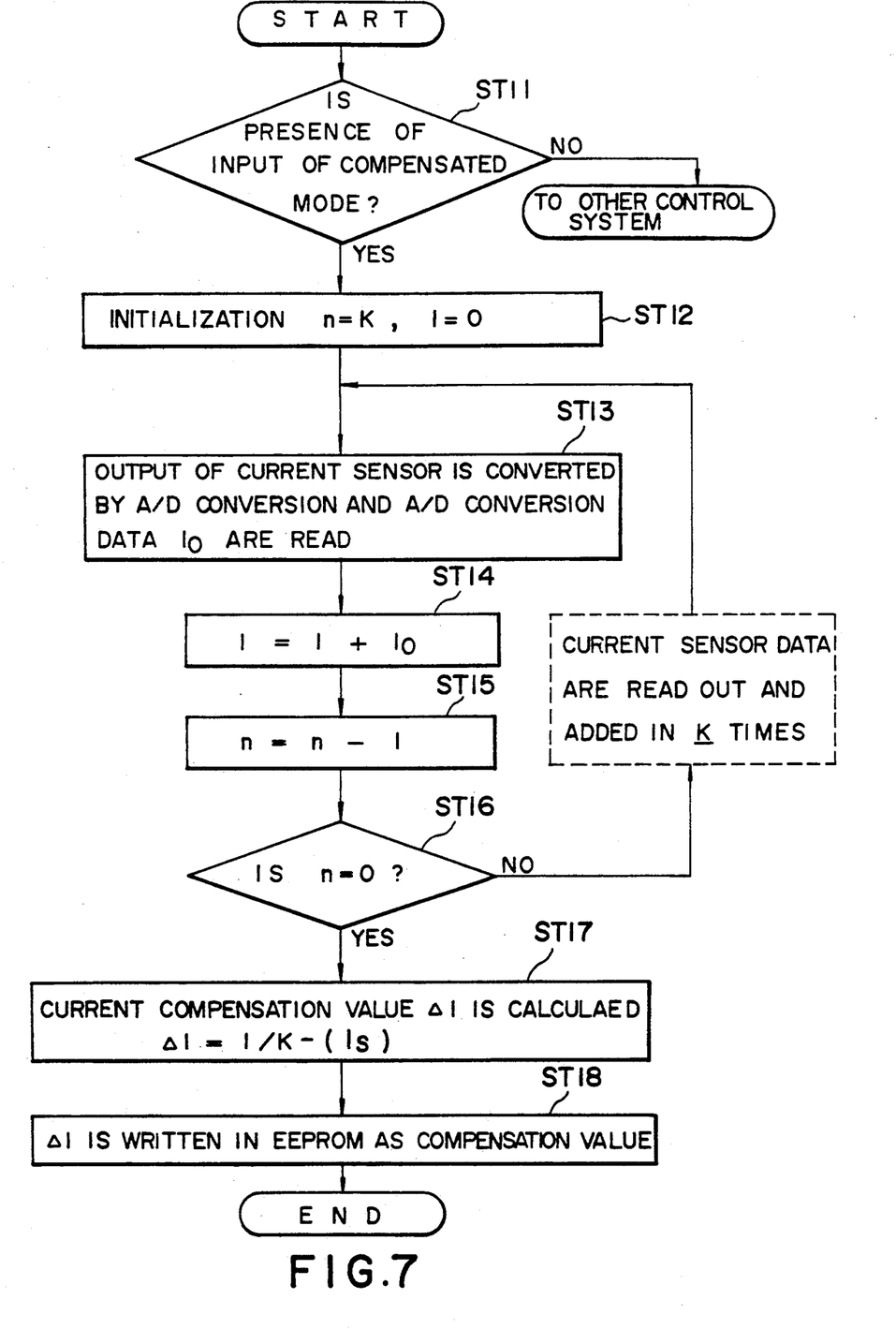
FIG. 7 is a flow chart describing the operation of the other embodiment of the present invention.

FIG. 7 is a flow chart showing the processing procedure of the CPU according to the second embodiment, which corresponds to the compensated current value determining 16. Here, the judgment is made (step ST11) for whether or not there is the compensation mode for the status where the allowable limit current is flowing to the load 32. Then, if the compensation mode has been judged, then the number of read times is set to K in the counter and the current value written in the RAM is initialized to "0" (step ST12). Next, the output data of the A/D converter 12 that converts the output signals of the current transformer 9 are read (step ST13), and this value is added to the value that was previously read, and written to the RAM (step ST14). Furthermore, the counter is decreased by "1" (step ST15). Then, a judgment is made for whether or not the value in the counter has become "0" or not and this processing is repeated for until it (step ST16). Then, at the stage when the value in the counter has become "0", the current compensated value $\Delta I$ is calculated for the value of K in the ROM, and the data for the allowable current value written beforehand in the ROM is subtracted from the value obtained above (step ST17).

Moreover, in this portion, repeatedly performing the read of the current K times is in order to exclude erroneous detection of the current value due to noise and the like.

The compensated value obtained in this manner is then written to the EEPROM 20 as the current data compensating means 21 (step ST18).

In order to describe the second embodiment more specifically, the mode of the air conditioning system is made to the compensation mode and a current of 19A for example, of the allowable limit is first allowed to flow to the detected line of the current transformer 9. This current that is flowing in this detected line is converted into a DC voltage by the current transformer 9 and input to the A/D converter 12. The digital data output of the A/D converter 12 is read K number of times, and the average value calculated. Here, if the output voltage of the DC power circuit 6 is made 0.2 V higher than the reference voltage of 5 V, then the digital data output of the A/D converter 12 is "187" and the results for the calculation of the average value becomes "187". Here, the CPU 11 calculates the difference of "−003" between the allowable current data "190" stored beforehand in the ROM, and the average value of "187".

Then the CPU 11 stores this difference of "−003" in the EEPROM 20 as the compensated current value $\Delta I$ and the compensation mode ends.

Then, when the air conditioning system is actually operating, then in the same manner as for the first embodiment, the CPU regards the value for the allowable current data "190" to which the compensation current value I of "−110" has been added as the new allowable current data "187" and the digital data output of the A/D converter 12 are compared. The result of this comparison is that the output frequency of the inverter 4 is lowered when the digital data output of the A/D converter 12 is greater than the new allowable current data "187".

Accordingly, when the output voltage of the DC power circuit 6 is 0.2 V higher than the reference voltage of 5 V, the allowable current data becomes equivalent to "187" for the digital data output of ther A/D converter 12, and the output frequency of the inverter 4 is lowered when the digital data of the A/D converter 12 exceeds "187". As the result of this, the output frequency of the inverter 4 is lowered when the current that actually flows in the detected line exceeds the current of 19A which is the allowable limit.

According to this second embodiment, it is possible for the functions of determining the current compensated value and the function of writing to the compensated current value memory means 21, to be incorporated into the CPU 11.

What is claimed is:

1. An air conditioning system having a compressor driven by a commercial power from a commercial power source and being able to perform fine adjustment of the inverter input current, comprising:
   a DC power circuit for converting said commercial power into a DC current;
   an inverter for inverting commecial AC power into a variable-frequency AC and supplying it to the compressor;
   current detection means for detecting an analog current value supplied from said commercial power;
   an A/D converter that uses the output of said DC power circuit as a reference for converting an output of said current detection means into digital DC data;

current limit means that compares an allowable value stored beforehand with the current data converted by the A/D converter and places a limit on the output frequency of said inverter so that the current supplied from the commercial power source does not exceed the allowable value;

compensated current value memory means for storing a compensated current value obtained by compensating for the discrepancy of said DC power circuit; and current data compensating means for compensating said allowable value of said current data in accordance with said compensated value.

2. The system of claim 1, further comprising:

compensated current value determining means for determining a time-average value of current data of said A/D converter in the case where a current corresponding to said allowable value for the current supplied from said commercial power flows in said current detection means, for calculating the discrepancy between the time-average value and an initial setting value for said allowable value of the current data, and for storing the discrepancy in said compensated current value memory means as said compensated current value.

3. The system of claim 1, further comprising:

frequency determining means for determining an output frequency of said inverter on the basis of temperature data converted into digital data by said A/D converter.

4. The system of claim 3, wherein:

said current limit means supplies a limit to a frequency of said inverter and which has been determined by said frequency determining means on the basis of comparison of an actual current data and allowable value of the current data.

5. The system of claim 1, further comprising:

a rectifier circuit provided between said current detection means and said inverter, and the rectifies and outputs AC current output of said commercial power.

6. The system of claim 5, further comprising a smoothing capacitor provided between said current rectifier circuit and said inverter, and that smooths said AC current of said rectifier ciircuit.

7. The system of claim 1, wherein:

said A/D converter, current limit means and current data compensating means are configured by a central processing unit (CPU).

8. The system of claim 7, wherein:

said compensated current value memory means is configured from an electrically erasable and programmable read only memory (EEPROM) provided with said CPU.

9. The system of claim 7, wherein:

said CPU is configured from a single-chip microcomputer.

10. A limit method of limiting an input current supplied from a commercial power source to an air conditioning system under a predetermined value, the air conditioning system which comprises an inverter for inverting said commercial source power into a variable-frequency AC and supplying it with a compressor, and in which a current transformer detects an analog value of AC supplied from said commercial power source to said air conditioning system, an A/D converter converts said analog value into digital data, and the digital data is compared with an allowable current data corresponding to an allowable current value stored beforehand, so that the supplied current from said commercial power source to said air conditioning system is limited under a predetermined value by controlling an output frequency of said inverter on the basis of a compared result, said method comprising:

(a) a step of converting said analog current value that is detected by a current transformer when a current having a predetermined value flows at a detected portion by said transformer, into said digital data by means of said A/D converter;

(b) a step of calculating a difference between converted digital data and digital data corresponding to said current value flowing at the detected portion by said transformer;

(c) a step of storing said difference calculated in the former step as a compensated value; and (d) a step of comparing said digital data output of said A/D converter with said allowable current data after reading out said compensated current value as a reference during operation of said air conditioning system.

* * * * *